July 13, 1965   G. L. HUEY   3,193,958
SIGN CONSTRUCTION

Filed Aug. 2, 1963   2 Sheets-Sheet 1

INVENTOR.
Guy L. Huey
BY
Frease, Bishop, Johns & Schick
ATTORNEYS

July 13, 1965
G. L. HUEY
3,193,958
SIGN CONSTRUCTION
Filed Aug. 2, 1963
2 Sheets-Sheet 2
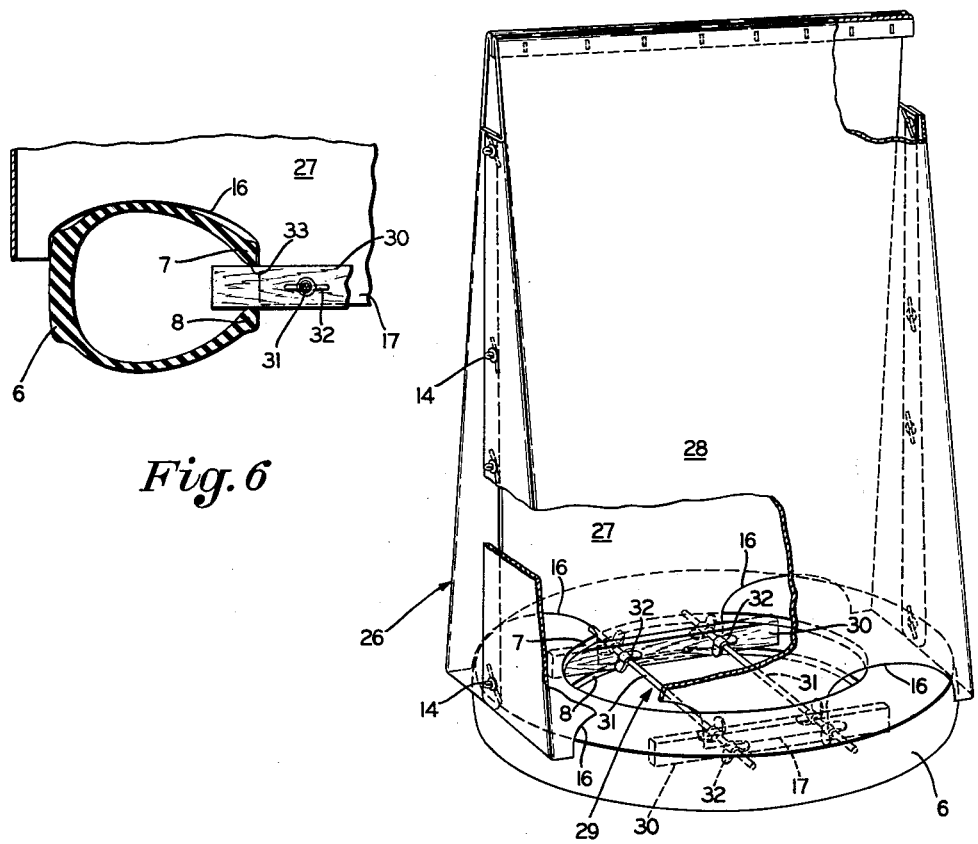
Fig.6
Fig.4
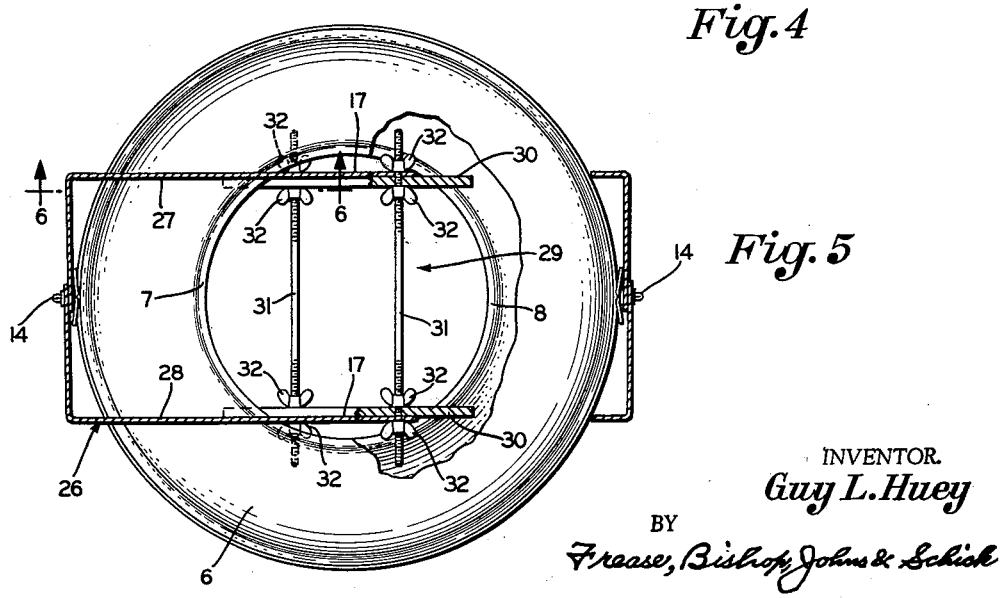
Fig.5
INVENTOR.
Guy L. Huey
BY
Frease, Bishop, Johns & Schick
ATTORNEYS United States Patent Office 3,193,958
Patented July 13, 1965

3,193,958
SIGN CONSTRUCTION
Guy L. Huey, Massillon, Ohio, assignor to The Massillon-Cleveland-Akron Sign Company, Massillon, Ohio, a corporation of Ohio
Filed Aug. 2, 1963, Ser. No. 299,617
1 Claim. (Cl. 40—125)

This invention relates to a sign construction for point-of-sale advertising. More particularly it pertains to a rigid paperboard type of sign which is specifically adapted to be mounted on a stack of automobile tires.

Paperboard has been used for outdoor advertising, such as for sales campaigns having a limited duration. A disadvantage of paperboard when used in outdoor advertising is its limited duration due to varying weather conditions. For sales campaigns of short periods, however, the paperboard sign is a desirable medium for advertising, because it is relatively inexpensive as compared with other materials.

Associated with the foregoing it is the consideration of a means of attaching a paperboard sign and holding it in the desired place and position. The various types of attachment means have been used from time to time, but none have been exceptionally satisfactory. Where the sign is mounted upon a stack of automobile tires, the means of attaching the sign is a problem.

It has been found that a paperboard sign may be attached to an automobile tire and maintained in place with a minimum of additional parts. The sign is preferably fabricated with fold lines for folding into a tent-like structure. The lower spaced edges of both sides of the resulting sign are cut to fit the contour of the tire surface on which the sign is mounted. Tie means are provided for holding the sign in place and to prevent the sign from being blown out of place by strong wind.

Accordingly, it is an object of this invention to provide a sign construction composed of paperboard sheets for mounting on a stack of automobile tires.

It is another object of this invention to provide a sign construction having a reinforced tent-like configuration with lower edges which fit on the top surface of an automobile tire.

It is another object of this invention to provide a sign construction having tie means for attachment to a tire to prevent the sign from being dislodged by wind.

Finally, it is an object of this invention to provide a sign construction which is composed of paperboard and which is relatively inexpensive to provide and simple to install.

These and other objects and advantages apparent to those skilled in the art from the following description and claim may be obtained, the stated results achieved, and the described difficulties overcome, by the methods, steps, procedures, operations, apparatus, parts, elements, and combinations which comprise the present invention, the nature of which is set forth in the following general statements, preferred embodiments of which—illustrative of the best mode in which applicant has contemplated applying the principles—is set forth in the following description and shown in the drawings, and which are particularly and distinctly pointed out and set forth in the appended claim forming part hereof.

In general terms the present invention may be described as comprising a sign preferably composed of paperboard sheets having upwardly converging sides for mounting on the side of an automobile tire, the lower ends of each side engaging the side of a tire and having central depending portions extending into the tire center, the signs forming an upper apex, the central depending portion of each sign having aperture means, and tie means extending through the apertures and secured to the tire for holding the sign in place.

Referring to the drawings forming part hereof in which the preferred embodiments are shown by way of example:

FIG. 4 is a perspective view, broken away, of another embodiment of the invention;

FIG. 5 is a horizontal sectional view through the sign on a plane above the tire;

FIG. 6 is a fragmentary vertical sectional view taken on the line 6—6 of FIG. 5.

Similar numerals refer to similar parts throughout the several views of the drawings.

Figure 1:
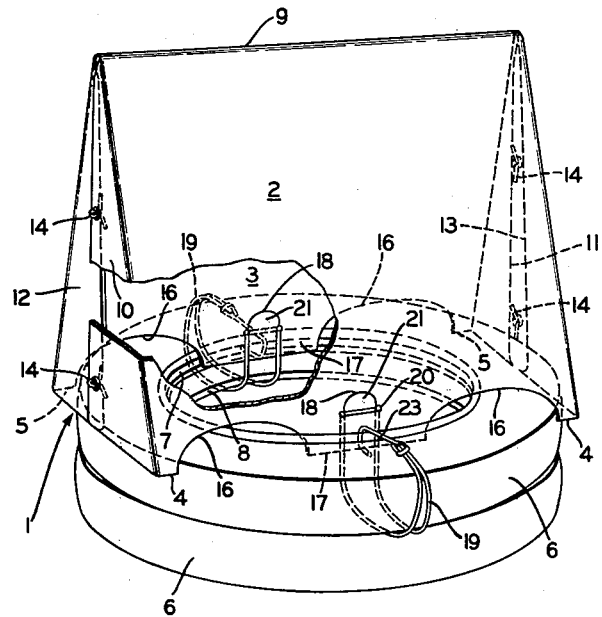
FIGURE 1 is a perspective view, broken away, of a paperboard sign mounted on a stack of automobile tires.
Figure 2:
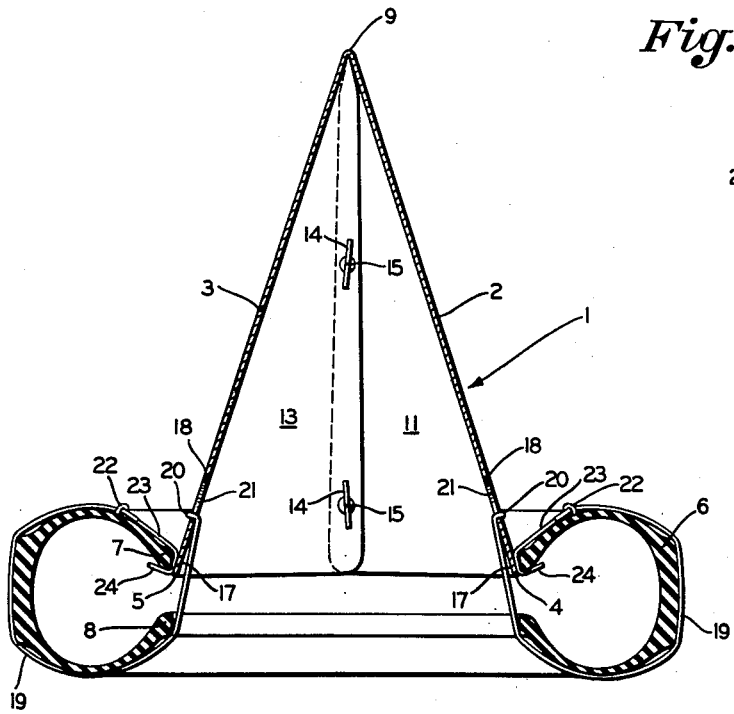
FIG. 2 is a vertical sectional view through the sign and one tire as shown in FIG. 1.

In FIG. 1 a sign construction is generally indicated at 1. It includes a tent-like structure having opposite sign portions or sides 2 and 3 with lower ends 4 and 5, respectively. The lower ends 4 and 5 are spaced apart and rest upon an automobile tire 6 having upper and lower beads 7 and 8.

The sides 2 and 3 extend upwardly and inwardly from their lower edges 4 and 5 and converge at their upper ends to form an apex 9. The edges of the sign portion 2 are provided with inturned edge flaps 10 and 11. Likewise, the edges of the side 3 are provided with inturned flaps 12 and 13. Flaps 10 and 12 have corresponding overlapping edge portions and are secured together by cotter pins 14 through aligned apertures 15 in the flaps. The flaps 11 and 13 are likewise secured together bp similar cotter pins 14.

The lower ends 4 and 5 have similar cut-out arcuate portions 16 adapted to fit the curvature of the tire 6 upon which the sides 2 and 3 rest. Between the arcuate portions 16 on each side 2 and 3 a central side portion 17 extends downwardly into the center opening of the tire 6. Each central portion 17 includes aperture means 18 or a U-shaped slot.

Figure 7:
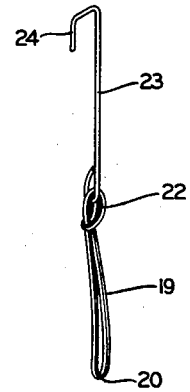
FIG. 7 is a perspective view of a metal hook with an elastic band attached.

The sign construction 1 is secured to the tire 6 by an elongated elastic band 19, such as a rubber band, which extends around the tire 6 and has a portion 20 extending through the slot 18 and against a tongue 21 formed by the slot. The other end portion 22 of the elastic band is knotted on a metal hook 23 having a hook end 24 (FIG. 7).

The assembly of the band 19 and the hook 23 is secured in place by engaging the hook end 24 on and around the bead 7 of the tire 6. Similar band and hook means are provided on diagonally opposite sides of the tire for attachment of each side 2 and 3 to the tire 6.

Figure 3:
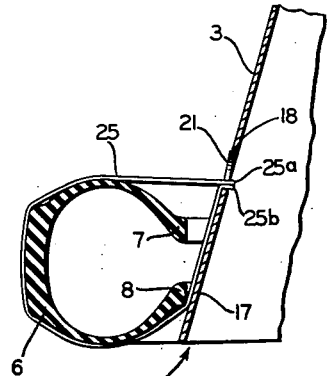
FIG. 3 is a fragmentary vertical sectional view of another means for mounting the sign.

A modified form of the attachment means (FIG. 3) for the sign 1 is a continuous elastic or rubber band 25 both end portions 25a and 25b of which are secured to the tongue 21 of the side 2. Thus, the sign 1 may be attached to the tire 6 only by an elastic band and the metal hook 23 may be omitted if desired.

Where an enlarged sign, such as sign 26, is provided with sign portions or sides 27 and 28 of greatly enlarged area, the sign may be secured to the tire 6 in a different manner. A sign having very large sides 27 and 28 presents greater resistance to wind. Means for attaching the sign 26 to the tire are generally indicated at 29 and include a pair of members or wood sticks 30 and a pair of elongated threaded rods 31 extending transversely between the members 30.

The members 30 are attached to the lower ends of the central depending portions 17 of the sides 27 and 28. Opposite end portions of each member 30 extend between the tire beads 7 and 8. The threaded rods 31 extend transversely between the members 30 and through aligned apertures (not shown) in said members and the lower central portions of the sides 27 and 28. The rods 31 are secured in place by wing nuts 32 on opposite sides of each member 30 and the corresponding sign portion 17. Once the spacing between the member 30 is established by the positioning of the wing nuts 32 on the rods 31, the spacing is fixed and the members 30 are held securely between the tire beads 7 and 8.

In addition, the vertical spacing between the arcuate portions 16 and the upper edge of each member 30 may be adjusted so that the members 30 clampingly engage the inner surfaces of the upper tire bead 7 at 33 (FIG. 6), thereby holding the arcuate portions 16 snugly against the upper curved side of the tire 6.

The device of the present invention provides a new and novel paperboard sign construction. Although the sign construction is provided primarily for the sales campaigns of short duration, the sign is firmly maintained against wind damage and displacement. The lower end of the sign is secured snugly in place by the use of tie means which engage the tire and withstand all normal wind pressures.

In the foregoing description, certain terms have been used for brevity, clearness and understanding, but no unnecessary limitations are to be implied therefrom beyond the requirements of the prior art, because such terms are used for descriptive purposes herein and not for the purpose of limitation and are intended to be broadly construed.

Moreover, the invention is not limited to the exact apparatus shown because the particular arrangement of the parts may be varied to provide other structural embodiments without departing from the scope of the present invention.

Having now described the features of the invention, the construction and operation of a preferred embodiment of the improved apparatus, the details of the steps of the improved method, and the advantageous, new and useful results obtained thereby, the new and useful inventions, methods, steps, procedures, operations, apparatus, parts, elements and combinations, discoveries, principles, and reasonable mechanical equivalents thereof obvious to those skilled in the art, are set forth in the appended claim.

What is claimed is:

A sign construction for mounting on the side of an automobile tire, including a pair of sheet-like paperboard signs having lower spaced ends engageable on a side of a tire, each end having a central depending portion extending into a tire center, the pair of sheet-like signs extending upwardly from their respective lower ends and having converging upper ends forming an apex, an elongated member on each central depending portion and having opposite end portions extending into a tire and between the beads thereof, and at least one spacer rod extending between and perpendicular to the members and holding the members in spaced apart relation with the opposite end portions disposed between the beads.

References Cited by the Examiner
UNITED STATES PATENTS

| | | | |
|---|---|---|---|
| 1,718,828 | 6/29 | Murphy | 40—125 |
| 2,267,529 | 12/41 | Leech | 40—125 |
| 2,632,268 | 3/53 | Schroeder | 40—125 |
| 2,774,163 | 12/56 | Wathen | 40—125 |

JEROME SCHNALL, *Primary Examiner.*